United States Patent [19]

Yamazaki

[11] Patent Number: 4,644,825

[45] Date of Patent: Feb. 24, 1987

[54] INDEXING AND POSITIONING DEVICE

[75] Inventor: Yoshio Yamazaki, Hamamatsu, Japan

[73] Assignee: Kabushiki Kaisha Yamazaki, Shizuoka, Japan

[21] Appl. No.: 678,014

[22] Filed: Dec. 4, 1984

[30] Foreign Application Priority Data

Apr. 16, 1984 [JP] Japan .................. 59-75166

[51] Int. Cl.[4] ............................. B23B 29/32
[52] U.S. Cl. ................ 74/813 R; 74/813 L; 74/826
[58] Field of Search ............ 74/813 C, 813 L, 813 R, 74/815, 822, 826

[56] References Cited

U.S. PATENT DOCUMENTS

| | | | |
|---|---|---|---|
| 3,088,340 | 5/1963 | Shotey | 74/813 |
| 3,091,135 | 5/1963 | Thompson | 74/826 |
| 3,177,740 | 4/1965 | Firestone et al. | 74/826 |
| 3,242,771 | 3/1966 | Maier et al. | 74/826 |
| 3,312,510 | 4/1967 | Brehm | 74/826 |
| 3,545,317 | 12/1970 | Shultz et al. | 74/826 |
| 3,718,055 | 2/1973 | Maier | 74/813 L |
| 3,762,013 | 10/1973 | Irie | 74/826 |
| 3,797,333 | 3/1974 | Maier | 74/813 L |

Primary Examiner—George L. Walton
Attorney, Agent, or Firm—Stevens, Davis, Miller & Mosher

[57] ABSTRACT

An indexing and positioning device comprises: a fixed inner ring; and outer ring disposed coaxially, coplanarly, and revolvably therearound with an annular boundary therebetween; a plurality of positioning recesses formed at equal indexing intervals along and straddling the boundary and comprising respective inner and outer parts respectively formed in the inner and outer rings, all recesses assuming a completely assembled state upon combination of the inner and respective outer parts in a specific indexing register; a plurality of positioning balls one of which is floatably accommodated within each of the positioning recesses; a retainer confining and guiding each of the positioning balls; and a clamp ring operable to press the positioning balls inward into the respective positioning recesses thereby to cause accurate and positive centering and positioning of indexing positions of the inner and outer rings relative to each other.

6 Claims, 9 Drawing Figures

INDEXING AND POSITIONING DEVICE

BACKGROUND OF THE INVENTION

This invention relates generally to indexing and positioning devices and more particularly to an indexing and positioning device capable of readily indexing the angle of revolution of a workpiece set on a turntable which is revolvable about an axis of revolution.

In general, indexing devices are widely used where the outer circular peripheries of articles are divided evenly or where a specific rotational angle is imparted to an article from a datum position. Among indexing devices of this character known in the prior art, those combining a geneva gear and a pin and those combining a ratchet wheel and a pawl have been used. While these indexing devices are of relatively simple construction, they have had the drawback of a lowered indexing precision due to an increasing back-lash and gaps caused by abrasive wear of parts such as main shafts and pins.

Furthermore, indexing devices in which crown gears are used are also being employed. This type of indexing device has the advantage of high precision, but has been accompanied by the problems of high price, a tendency to be bulky, and a difficulty in making it compact.

SUMMARY OF THE INVENTION

Accordingly, it is an object of this invention to provide an indexing and positioning device which is capable of carrying out high-precision and positive indexing and yet can be designed and constructed to have a relatively thin and compact form.

According to this invention, briefly summarized, there is provided an indexing and positioning device in which: on the outer side of an inner ring, an outer ring is coaxially disposed in a manner to be revolvable relative thereto; a plurality of positioning recesses are formed with equal spacing along and straddling the peripheral edges of these inner and outer rings at their annular boundary; positioning members of the same plural number as the positioning recesses are accommodated respectively in these recesses; and these positioning members are held by retainer means; and a clamping ring is adapted to press the positioning members toward the bottoms of their respective positioning recesses thereby to accurately and positively center and position the inner and outer rings in a specific indexing position relative to each other.

The nature, utility, and further features of this invention will be more clearly apparent from the following detailed description with respect to preferred embodiments of the invention when read in conjunction with the accompanying drawings, briefly described below.

DETAILED DESCRIPTION OF THE INVENTION

Figure 1:
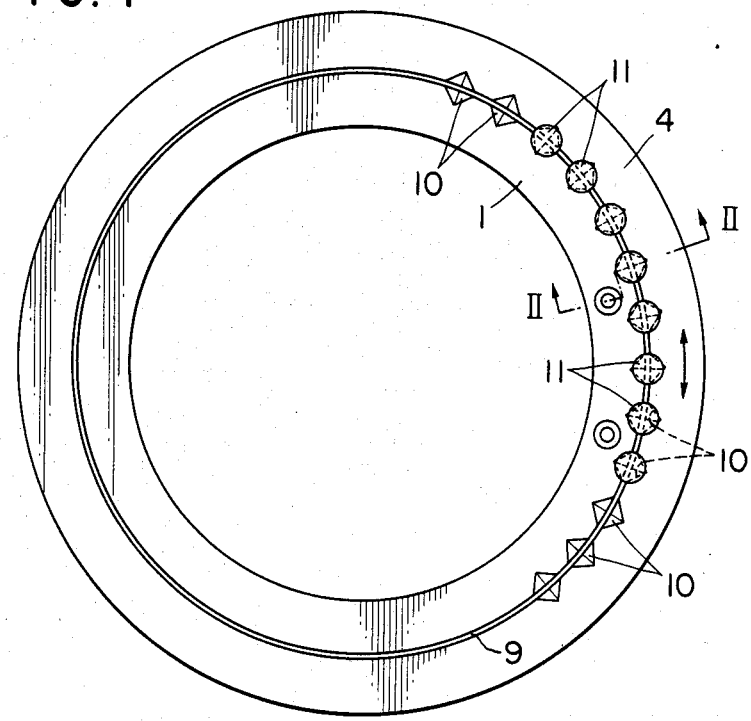
FIG. 1 is a plan view showing inner and outer rings and a portion of positioning balls constituting essential parts of one example of the indexing and positioning device according to this invention.
Figure 2:
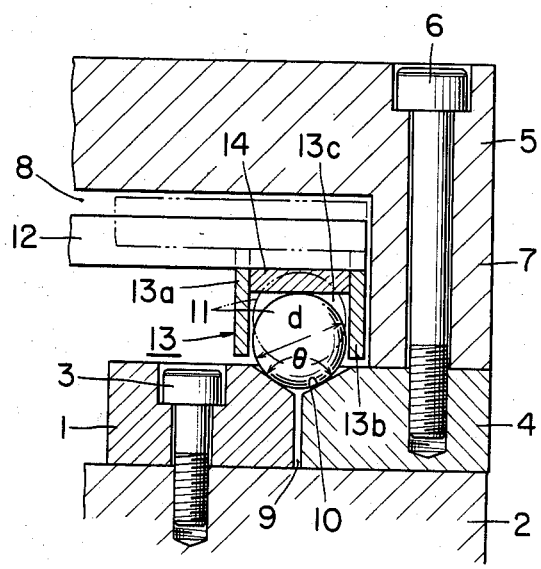
FIG. 2 is a section taken along the plane indicated by line II—II in FIG. 1 as viewed in the arrow direction and is somewhat enlarged relative thereto.
Figure 3:
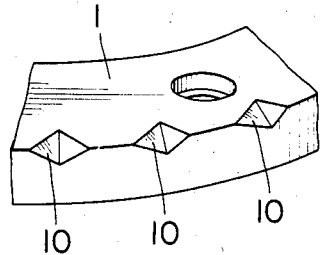
FIG. 3 is a fragmentary perspective view showing one portion of the inner ring.

Referring first to FIGS. 1 and 2, the example of a rotational indexing device according to this invention illustrated therein has an inner ring 1 and an outer ring 4 in mutually coaxial and coplanar relation with an annular gap 9 therebetween. The inner ring 1 is fixed by bolts 3 to the upper surface of a base 2, while the outer ring 4 is adapted to be revolvable about the inner ring 1 in sliding movement on the upper surface of the base 2 while maintaining the annular gap 9. In the illustrated example, a turntable 5 is supported on the outer ring 4, an outer peripheral wall 7 of the turntable 5 resting on the upper surface of the outer ring 4 and being fixed thereto by bolts 6.

A substantially cylindrical space 8 is formed between the inner surface of the wall 7, the lower surface of the upper part of the turntable 5, the upper surfaces of the inner and outer rings 1 and 4, and other lower parts including the base 2.

Along, around, and in a manner to straddle the annular gap 9, a plurality of positioning recesses or notches 10, 10, ..., 10 are formed in the upper outer rim of the inner ring 1 and correspondingly in respectively registerable indexing positions in the upper inner rim of the outer ring 4. The number of these notches 10, 10, ... 10 is determined by the minimum dividing or indexing angle. In the illustrated example, this number of positioning notches is 36, whereby the minimum indexing angle is 10 degrees. Furthermore, each positioning notch 10 in the illustrated example is a recess having the shape of an inverted pyramid with a square or equilateral parallelepiped base and with its vertex at the center of the gap 9, one half part of which is formed in the outer rim of the inner ring 1, while the other half part is formed in the inner rim of the outer ring 4. Accordingly, the recess bottom line on the side of the inner ring 1 and that on the side of the outer ring 4 form an angle $\theta$ and meet at a vertex at the center of the gap 9. The inner and outer rings 1 and 4 thus constitute what may be called a double wedge ring.

Furthermore, a steel ball 11 for positioning is floatably accommodated in each of the positioning notches 10, 10, ..., 10. These positioning balls 11, 11, ..., 11, all of which have the same diameter d, become stabilized when the positioning notch halves 10, 10, ..., 10 of the inner and outer rings 1 and 4 are in respectively registered state.

Within the aforementioned space 8 on the inner side of the turntable 5, a disk-shaped holding plate or clamp ring 12 is accommodated coaxially with the inner and outer rings 1 and 4 and in a manner permitting it to move up and down. To the lower surface of this clamp ring 12 around the peripheral part thereof are fixed a plurality of ball retainers 13 adapted to confine and guide the positioning balls 11, 11, ..., 11 in a single annular path above and along the positioning notches 10, 10, ..., 10.

In the illustrated example, the ball retainer 13 comprises an inner sleeve 13a, an outer sleeve 13b and circumferentially spaced-apart suitable partition members 13c on opposite sides of each ball. Untoward movements of the positioning balls 11, 11, ..., 11 in the circular circumferential direction can thus be prevented by the partition members 13c. An annular pressing pad 14 is fixed in place within these ball retainers 13 at the upper parts thereof so as to contact and be able to press down on the balls 11, 11, ..., 11. This pressing pad 14 is preferably made of a hard elastic material.

Figure 4:
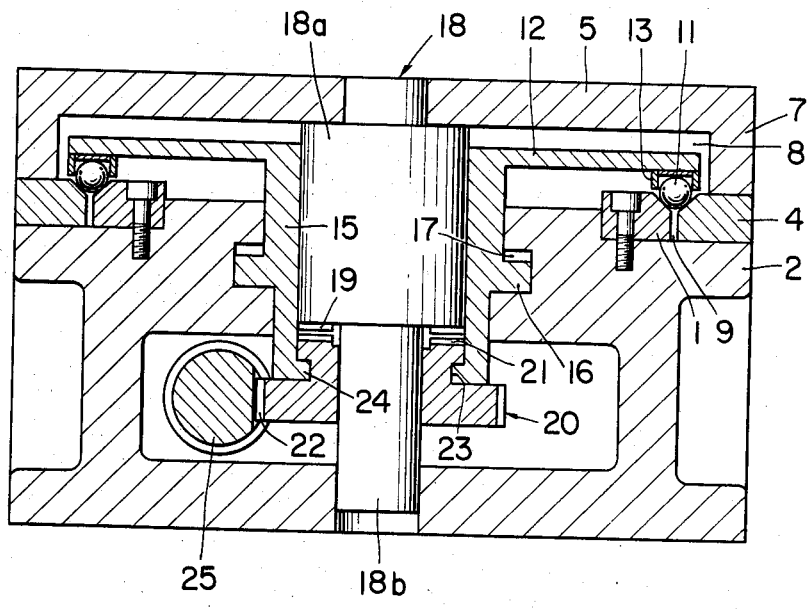
FIG. 4 is a vertical sectional view of an indexing and positioning device in which a clamp ring is driven in vertical movement by a hydraulic cylinder actuator, and a turntable is driven through a rack-pinion mechanism.

FIG. 4 shows a device for driving in rotation the turntable 5 and the clamp ring 12. A sleeve 15 is provided on the radially inner rim of the clamp ring 12 integrally and coaxially therewith. On the outer surface of the sleeve 15 there is provided a piston 16 which is accommodated movably up and down within a cylinder bore 17 in the base 2, whereby the clamp ring 12 is caused to move between an unclamping position indicated by two-dot chain line in FIG. 2 and a clamping position indicated by solid line.

Within the sleeve 15 is rotatably disposed a vertical main spindle 18, and the upper end of the main spindle 18 is connected integrally and coaxially to the turntable 5. The main spindle 18 can rotate about its vertical axis relative to and independently of the clamp ring 12. The main spindle 18 has an upper portion 18a of a greater diameter and a lower portion 18b of a smaller diameter. A driven crown gear 19 is formed on the lower annular end surface of the upper portion 18a. A driving gear 20 is disposed movably up and down around the lower portion 18b of the main spindle 18. The driving gear 20 has a crown gear 21 formed on the upper annular end surface thereof to mesh with the crown gear 19. A pinion gear 22 is formed on the lower portion of the driving gear 20. An annular groove 23 is formed in the central portion of the driving gear 20. Into the annular groove 23 is engaged a hook portion 24 formed on the lower end of the sleeve 15. The upward and downward movements of the piston 16 bring the crown gear 21 into and out of engagement with the crown gear 19. A rack 25 is in mesh with the pinion gear 22. The rack 25 is reciprocally moved by a hydraulic cylinder device (not shown) thereby to rotate the pinion gear 22.

Alternatively, as another example, the main spindle 18 can be driven by a D.C. servomotor through a worm screw shaft and a worm wheel (not shown).

At the time of clamping of the positioning balls 11, 11, ..., 11 in the example of the indexing device of this invention of the above described construction, the clamp ring 12 is pressed downward to its position indicated by solid line in FIG. 2, whereby the pressing pad 14 presses all balls 11, 11, ..., 11 against the bottom surfaces of their respective positioning notches 10, 10, ..., 10. The resulting wedge or centering action of the balls 11, 11, ..., 11 causes the centers of the outer and inner rings 4 and 1 to coincide and, at the same time, the notch halves on the inner ring side to become compulsorily coincident in alignment with their corresponding notch halves on the outer ring side, whereby a specific indexing position is set.

Then, when it is desired to cause the outer ring 4, together with the turntable 5 to revolve from this indexing position through a specific angle to a desired position, the clamp ring 12 is raised to the position indicated by two-dot chain line in FIG. 2 by actuating the piston 16 upwardly. With the clamp ring 12 in this raised state, the outer ring 4, together with the turntable 5, can be revolved in either direction, and the turntable 5 can be revolved through an angle close to the desired set angle. For this approximate angle setting, an angle-calibrated scale may be additionally used, or some other known means may be used.

Then, when the clamp ring 12 is pressed downward by actuating the piston 16 downwardly, the pressing pad 14 presses the balls 11, 11, ..., 11 toward the positioning notches 10, 10, ..., 10. As a result, the inner and outer rings 1 and 4 are adjusted accurately and positively to their specified relative positions, whereby indexing and positioning are thus accomplished. In this manner according to this invention, accurate and positive angular indexing and positioning of the outer ring 4 relative to the fixed inner ring 1 become possible through the intermediation of the positioning balls 11, 11, ..., 11.

While, in the above described example, the inner ring 1 is fixed, while the outer ring 4 is revolved, a converse arrangement wherein the outer ring is fixed and the inner ring 1 is revolvable may be used.

Other examples of practice will now be described with reference to FIGS. 5 through 9.

Figure 5:
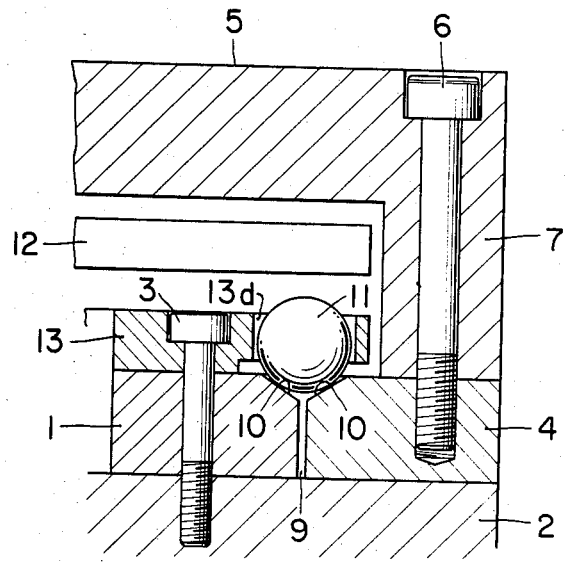
FIG. 5 is a relatively enlarged section showing the ball retainer according to an example of another embodiment of the invention in which the ball retainer is fixed to the inner ring.

The device illustrated in FIG. 5 is an example of the invention wherein the ball retainer 13 is fixed by bolts 3 to the upper surface of the inner ring 1 which is supported to the base 2 stationarily. The ball retainer 13 is provided with holes 13d of the same plural number as the balls in the outer peripheral portion thereof. The steel ball 11 for positioning is floatably accommodated in each of the holes 13d.

Figure 6:
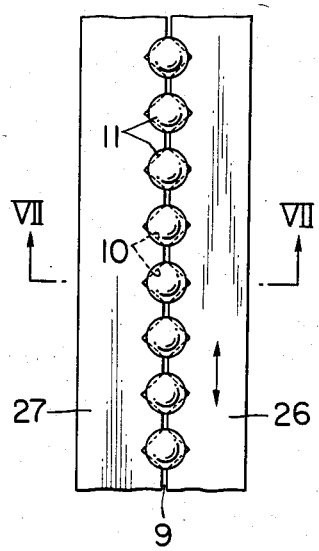
FIG. 6 is a partial plan view of essential parts of an example of a linear-movement indexing and positioning device according to the invention.
Figure 7:
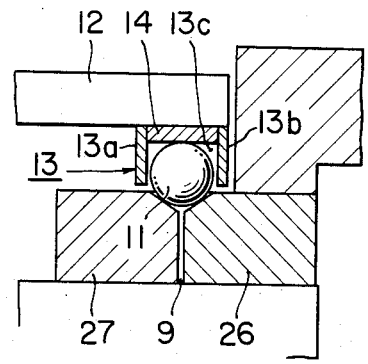
FIG. 7 is a section taken along the plane indicated by line VII—VII in FIG. 6 as viewed in the arrow direction.

The device illustrated in FIGS. 6 and 7 is an example of the case wherein the radii of curvature of the inner and outer rings 1 and 4 in the preceding example have been made infinite. In this example, the outer "ring" or member 26 can be moved in a straightline direction relative to the inner "ring" or member 27, whereby this mechanism is convenient for use in machines such as transfer machines.

Figure 8:
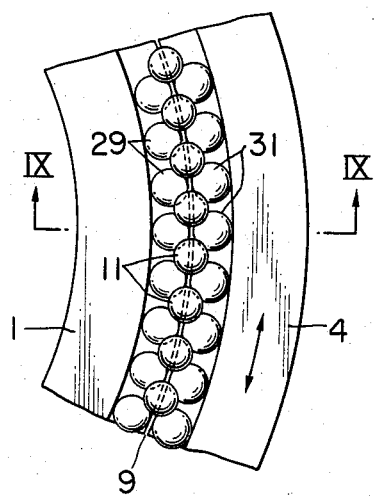
FIG. 8 is a fragmentary plan view showing an example of another embodiment of the invention in which groups each of four adjacent fixed balls form positioning recesses.
Figure 9:
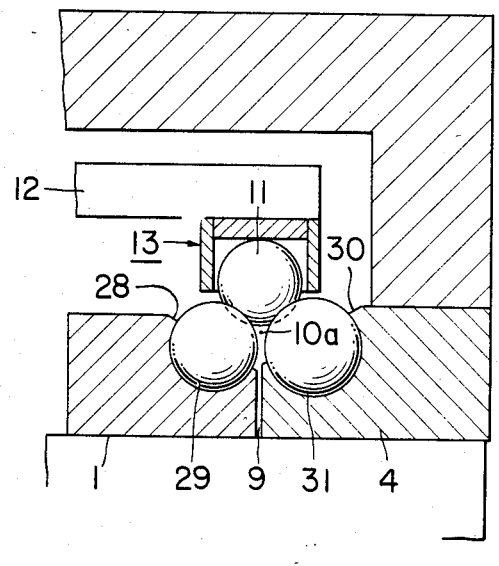
FIG. 9 is a relatively enlarged section taken along the plane indicated by line IX—IX in FIG. 8 as viewed in the arrow direction.

In a further example as shown in FIGS. 8 and 9, a positioning recess or notch is formed between each group of four adjacent fixed balls which are partially exposed and imbeddedly disposed in the inner and outer rings 1 and 4. More specifically, a beveled or chamfered surface 28 is formed around the upper outer peripheral edge of the inner ring 1. In and circumferentially around this chambered part 28 are formed a plurality of partly spherical recesses at a constant angular pitch and function to receive in partly imbedded state respective inner fixed balls 29, 29, ..., 29, approximately a half of each ball 29 being exposed and not thus imbedded. In opposed relation to the chamfered part 28, a chamfered part 30 is formed in and around the upper inner edge of the outer ring 4. In and circumferentially around this chamfered part 30 are formed partly spherical recesses of the same plural number as the balls 29, 29, ..., 29 to receive in partly imbedded state respective outer fixed balls 31, 31, ..., 31. Approximately a half of each of these balls 31, 31, ..., 31 is also exposed.

An important feature of this mechanism is that the inner fixed balls 29, 29, ..., 29 and the outer fixed balls 31, 31, ..., 31 are positionally set with equal angular pitches, whereby, when each of the inner fixed balls 29, 29, ..., 29 and a respective outer fixed ball 31 are alined on the same radial line, positioning recesses or notches 10a, 10a, ..., 10a are formed between groups of four adjacent fixed balls, as shown in FIGS. 8 and 9, to receive respective positioning balls 11, 11, ..., 11. In this example device, also, similarly as in the example shown in FIG. 2, when the clamping 12 is lowered, and the pressing pad 14 presses the positioning balls 11, 11, ..., 11 downward, the balls 11, 11, ..., 11 enter into their respective positioning recesses 10a to set the relative position of the outer ring 4a relative to the inner ring 1 and thereby to accomplish accurate and positive positioning and indexing.

As will have become apparent from the foregoing description, this invention provides a positioning and indexing device of a construction in which: positioning recesses are formed to straddle the boundary between an inner ring and an outer ring; positioning balls are floatably accommodated in these recesses; and the positioning balls can be pressed by a clamp ring. By this construction and operation, centering wherein the outer ring is caused to become coaxial relative to the inner ring is accomplished, and, at the same time, the positioning recess halves on the inner ring side and those on the outer ring side are brought precisely and positively into register, whereby accurate and positive indexing and positioning can be carried out. Furthermore, since the lofting of the positioning balls out of the positioning recesses permits the outer ring to revolve relative to the inner ring, the indexing and positioning device can be designed and constructed to have a small height (thin dimension) and to be compact.

What is claimed is:

1. An indexing and positioning device comprising: an inner ring; an outer ring disposed coaxially and closely around an outer side of the inner ring with an annular boundary therebetween forming a gap, said inner and outer rings having respective first surfaces disposed in the same plane, one of the inner and outer rings being fixed and the other ring being adapted to revolve relative thereto about the common axis thereof; a plurality of positioning recesses provided as depressions in said first surfaces at equal indexing intervals along, and straddling said boundary; each of said positioning recesses being in the shape of an inverted pyramid with an equilateral parallelepiped base constituting an opening edge of the recess, which is formed symmetrically on inner and outer sides of said boundary as symmetrically opposed inner and outer parts of the recess formed respectively in an outer edge rim of the inner ring and in an inner edge rim of the outer ring when said inner and outer parts are brought into mutually coincident register in an indexing position; a plurality of positioning members one of which is floatably accommodated within each of the positioning recesses; retainer means confining and guiding each of the positioning members; and a clamp ring operable to press the positioning members into the respective positioning recesses to thereby cause accurate and positive centering and positioning of indexing positions of the inner and outer rings relative to each other.

2. An indexing and positioning device according to claim 1 in which the retainer means is fixed to the lower surface of the clamp ring around the peripheral part thereof.

3. An indexing and positioning device according to claim 1 in which the retainer means is fixed to the upper surface of the inner ring which is supported to the base stationarily.

4. An indexing and positioning device according to claim 1 in which the positioning members are balls made of a hard and non-brittle material.

5. An indexing and positioning device according to claim 1 in which the inner ring is fixed to and supported by a base structure, and the outer ring is fixed to a turntable revolvably supported relative to the base structure to be revolvable about the common axis of the inner and outer rings.

6. An indexing and position device comprising: a first indexing member; a second indexing member disposed closely adjacent one side of the first indexing member with a boundary therebetween defining a gap, said first and second indexing members having respective first surfaces disposed in the same plane, said first and second indexing members being adapted to move relative to one another; a plurality of positioning recesses provided as depressions in said first surfaces at equal indexing intervals along, and straddling said boundary; each of said positioning recesses being in the shape of an inverted pyramid with an equilateral parallelepiped base constituting an opening edge of the recess, which is formed symmetrically on inner and outer sides of said boundary as symmetrically opposed inner and outer parts of the recess formed respectively in an outer edge of the first indexing member and in an inner edge of the second indexing member when said inner and outer parts are brought into mutually coincident register in an indexing position; a plurality of positioning members one of which is floatably accommodated within each of the positioning recesses; retainer means confining and guiding each of the positioning members; and a clamp member operable to press the positioning members into the respective positioning recesses to thereby cause accurate and positive centering and positioning of indexing positions of the first and second indexing members relative to each other.

* * * * *